(12) United States Patent
Roy et al.

(10) Patent No.: US 10,354,340 B2
(45) Date of Patent: Jul. 16, 2019

(54) WORKFLOW TO AMPLIFY CONTENT OVER A PLURALITY OF SOCIAL MEDIA PLATFORMS IN DIFFERENT REGIONS

(71) Applicant: Dell Products L.P., Round Rock, TX (US)

(72) Inventors: Mainak Roy, Kolkata (IN); Rathi B, Bangalore (IN); Sharmad S. Naik, Bangalore (IN); Deepak Ravishankar, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 536 days.

(21) Appl. No.: 14/881,418

(22) Filed: Oct. 13, 2015

(65) Prior Publication Data

US 2017/0103130 A1 Apr. 13, 2017

(51) Int. Cl.
*G06Q 50/00* (2012.01)
*G06F 17/28* (2006.01)

(52) U.S. Cl.
CPC ........... *G06Q 50/01* (2013.01); *G06F 17/289* (2013.01)

(58) Field of Classification Search
None
See application file for complete search history.

(56) References Cited

U.S. PATENT DOCUMENTS

| | | | | |
|---|---|---|---|---|
| 2011/0022450 | A1* | 1/2011 | Meredith | G06Q 10/10 705/14.4 |
| 2012/0072494 | A1* | 3/2012 | Wong | G06F 17/3089 709/204 |
| 2013/0046826 | A1* | 2/2013 | Stanton | G06Q 10/10 709/204 |
| 2013/0179440 | A1* | 7/2013 | Gordon | G06Q 10/06 707/731 |
| 2013/0310163 | A1* | 11/2013 | Smith | G07F 17/3241 463/26 |
| 2014/0118142 | A1* | 5/2014 | Narayanaswami | G06Q 10/0635 340/539.13 |
| 2014/0222413 | A1* | 8/2014 | Rossmann | G06F 17/289 704/3 |
| 2015/0100377 | A1* | 4/2015 | Penumaka | G06Q 30/0201 705/7.29 |
| 2015/0189118 | A1* | 7/2015 | Ogata | H04N 1/32101 348/231.3 |

(Continued)

*Primary Examiner* — Wilson Lee
(74) *Attorney, Agent, or Firm* — Terrile, Cannatti & Chambers; Stephen A. Terrile

(57) ABSTRACT

A system, method, and computer-readable medium are disclosed for a social media amplification operation which includes a workflow to amplify content over a plurality of social media platforms. More specifically, in certain embodiments, the workflow translates social media postings made in one language (e.g., the English language) into postings in multiple languages. Additionally, in certain embodiments, the broadcast the social media posting via a region specific user names (e.g., a region specific handle). Additionally, in certain embodiments, the workflow further includes identifying and adding region specific influencers. Additionally, in certain embodiments, the workflow further includes identifying and using region specific tag data (e.g., a region specific #tag) for the region and amplifying the information across multiple region specific social media platforms in their preferred time.

15 Claims, 6 Drawing Sheets

(56) References Cited

U.S. PATENT DOCUMENTS

| | | | |
|---|---|---|---|
| 2016/0004692 A1* | 1/2016 | Rogowski | G06F 17/2854 704/3 |
| 2016/0034426 A1* | 2/2016 | Khanwalkar | H04L 51/32 715/277 |
| 2016/0112829 A1* | 4/2016 | Kalb | H04W 4/06 455/456.3 |
| 2016/0162837 A1* | 6/2016 | Muntes Mulero | G06Q 10/103 705/301 |
| 2016/0170973 A1* | 6/2016 | Zhang | G06F 17/289 704/3 |
| 2016/0188703 A1* | 6/2016 | Huang | G06F 17/30705 707/750 |
| 2016/0191448 A1* | 6/2016 | Eck | H04L 51/32 709/206 |
| 2017/0064035 A1* | 3/2017 | Lai | H04L 67/306 |

\* cited by examiner

WORKFLOW TO AMPLIFY CONTENT OVER A PLURALITY OF SOCIAL MEDIA PLATFORMS IN DIFFERENT REGIONS

BACKGROUND OF THE INVENTION

Field of the Invention

The present invention relates to information handling systems. More specifically, embodiments of the invention relate to a workflow to amplify content over a plurality of social media platforms.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The widespread availability of such information handling systems has been instrumental in the adoption of social media into the mainstream of everyday life. Social media commonly refers to the use of web-based technologies for the creation and exchange of user-generated content for social interaction. Twitter is an example of such a social media platform where users from across the world come together to engage in live, public or professional conversations. Advertisers can participate in these conversations by connecting with users that have diverse backgrounds and interests. Social media platforms provide an effective means of sharing thoughts and views. Multi-lingual information helps you to penetrate remote demographics.

However, when information is shared (e.g., any documentation, updates, announcements, and/or videos) via a social media platform such as twitter or Facebook in one language (e.g., the English language), customers who do not understand the language are not be able to consume the information. Many users of social media platforms wish to access information provided via the social media platform in their native language. According to a recent Eurobarometer survey, 9 out of 10 European internet users prefer browsing in their own language.

It is known to communicate with groups of users via a social media platform which delivers delivering short messages. As an example, Twitter® has become an increasingly popular platform for delivering short messages to an associated group of users. With a social media platform, short message identification is often accomplished via a short message tag identifier. In certain social media platforms, this short message tag identification is accomplished using metadata such as tag data (e.g., identified as #tag (pronounced "hashtag")).

SUMMARY OF THE INVENTION

A system, method, and computer-readable medium are disclosed for a social media amplification operation which includes a workflow to amplify content over a plurality of social media platforms. More specifically, in certain embodiments, the workflow translates social media postings made in one language (e.g., the English language) into postings in multiple languages. Additionally, in certain embodiments, the broadcast the social media posting via a region specific user names (e.g., a region specific handle). Additionally, in certain embodiments, the workflow further includes identifying and adding region specific influencers. Additionally, in certain embodiments, the workflow further includes identifying and using region specific tag data (e.g., a region specific #tag) for the region and amplifying the information across multiple region specific social media platforms in their preferred time. Additionally, in certain embodiments a short message is generated from a specific company user name (e.g., company specific identifier) and is replicated across different region according to any region specific preferences.

The social media amplification operation assists companies in reaching a global audience by leveraging the core content of the company. Such a social media amplification operation provides users interested in information about a company or company products with information in their native (or preferred) language for the content for which they are searching. The workflow of the social media amplification operation addresses a plurality of scenarios. More specifically, the social media amplification operation enables single sourcing for content, translates social media posts from one language to a plurality of languages, broadcasts the information using native languages through region specific handles, adds region specific influences to the broadcast, uses region specific tag data, maps associated channels (e.g., different social media platforms) based on the demographics of a region and amplifies the information across a plurality of region specific social media platforms, maintains a synergy across multiple company owned accounts, maintains resemblances among the tag data being used by different company identifiers, maintains resemblances among the tag data being used for company specific content and contributes to and strengthens a social media platform company brand by spreading the social media content across a global audience.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Aspects of the present disclosure include a recognition that it is desirable to post to social media platforms across multiple languages, to reach larger audiences without costing the company posting more time and money. Spreading information in multiple languages is important to capture the attention of native customers. Additionally, when there is a release of a company product where different locations have different release times it becomes important to be able to post the information at specific time considering different demographic parameters. A preferable time to post information to a social media platform may vary by geographic location (e.g., by country, region or continent). Finding a desirable time to post on a specific social media platform is an important consideration, especially when each of these social media platforms has its own audience. Additionally, the sentiment of a user may vary from region to region, from language to language as well as other native preferences.

Additionally, aspects of the present disclosure include a recognition that in many situations, a company's presence on a social media platform serves as a gateway to their website. This gateway can be especially beneficial to companies which conduct a large amount of business via their website. Accordingly, it is desirable to reach different region using suitable languages, giving preference to their timing, connecting via influencers and opting for the best fit #tags over multiple platforms to cover all the potential business.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
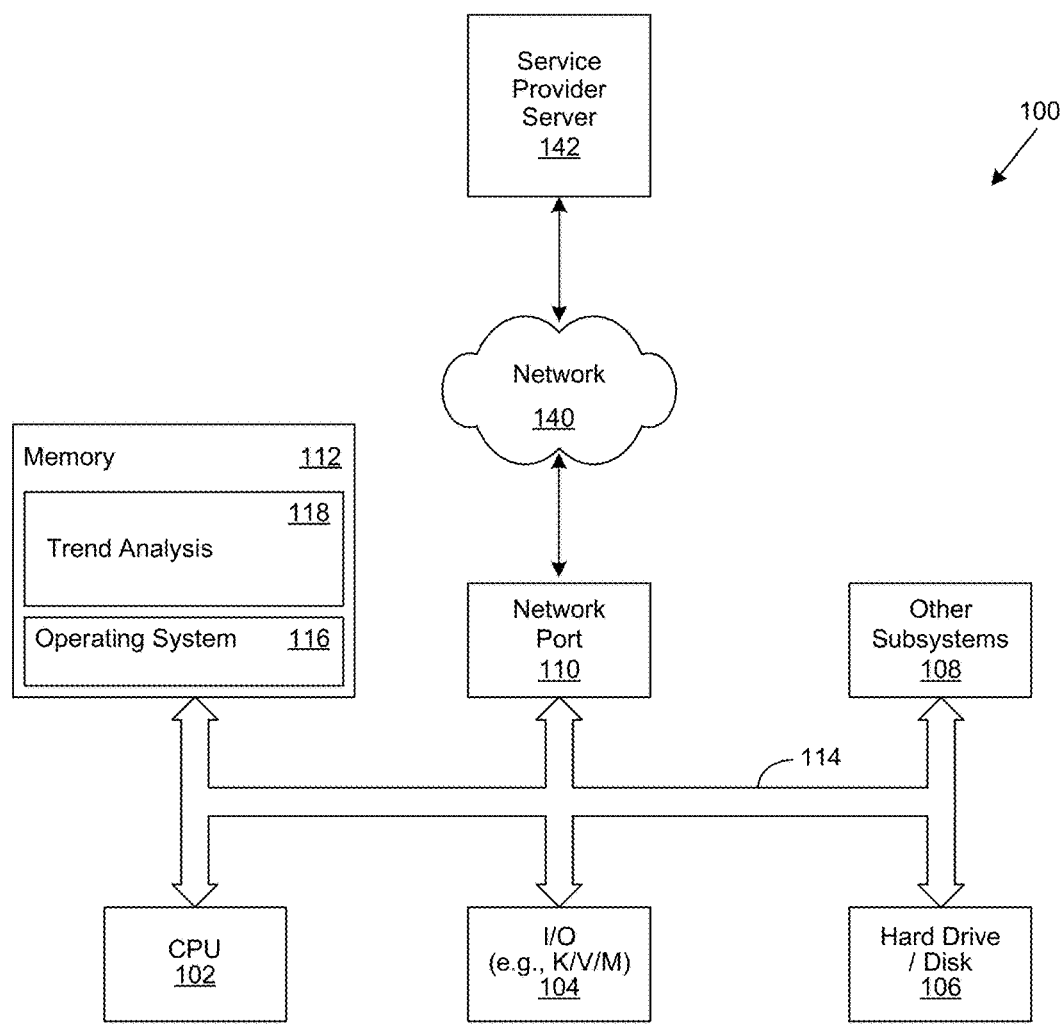
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a social media amplification module 118.

The short message module 118 performs a social media amplification operation which includes a workflow to amplify content over a plurality of social media platforms. More specifically, in certain embodiments, the workflow translates social media postings made in one language (e.g., the English language) into postings in multiple languages. Additionally, in certain embodiments, the broadcast the social media posting via a region specific user names (e.g., a region specific handle). Additionally, in certain embodiments, the workflow further includes identifying and adding region specific influencers. Additionally, in certain embodiments, the workflow further includes identifying and using region specific tag data (e.g., a region specific #tag) for the region and amplifying the information across multiple region specific social media platforms in their preferred time. Additionally, in certain embodiments a short message is generated from a specific company user name (e.g., company specific identifier) and is replicated across different region according to any region specific preferences.

The social media amplification operation assists companies in reaching a global audience by leveraging the core content of the company. Such a social media amplification operation provides users interested in information about a company or company products with information in their native (or preferred) language for the content for which they are searching. The workflow of the social media amplification operation addresses a plurality of scenarios. More specifically, the social media amplification operation enables single sourcing for content, translates social media posts from one language to a plurality of languages, broadcasts the information using native languages through region specific handles, adds region specific influences to the broadcast, uses region specific tag data, maps associated channels (e.g., different social media platforms) based on the demographics of a region and amplifies the information across a plurality of region specific social media platforms, maintains a synergy across multiple company owned accounts, maintains resemblances among the tag data being used by different company identifiers, maintains resemblances among the tag data being used for company specific content and contributes to and strengthens a social media platform company brand by spreading the social media content across a global audience.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
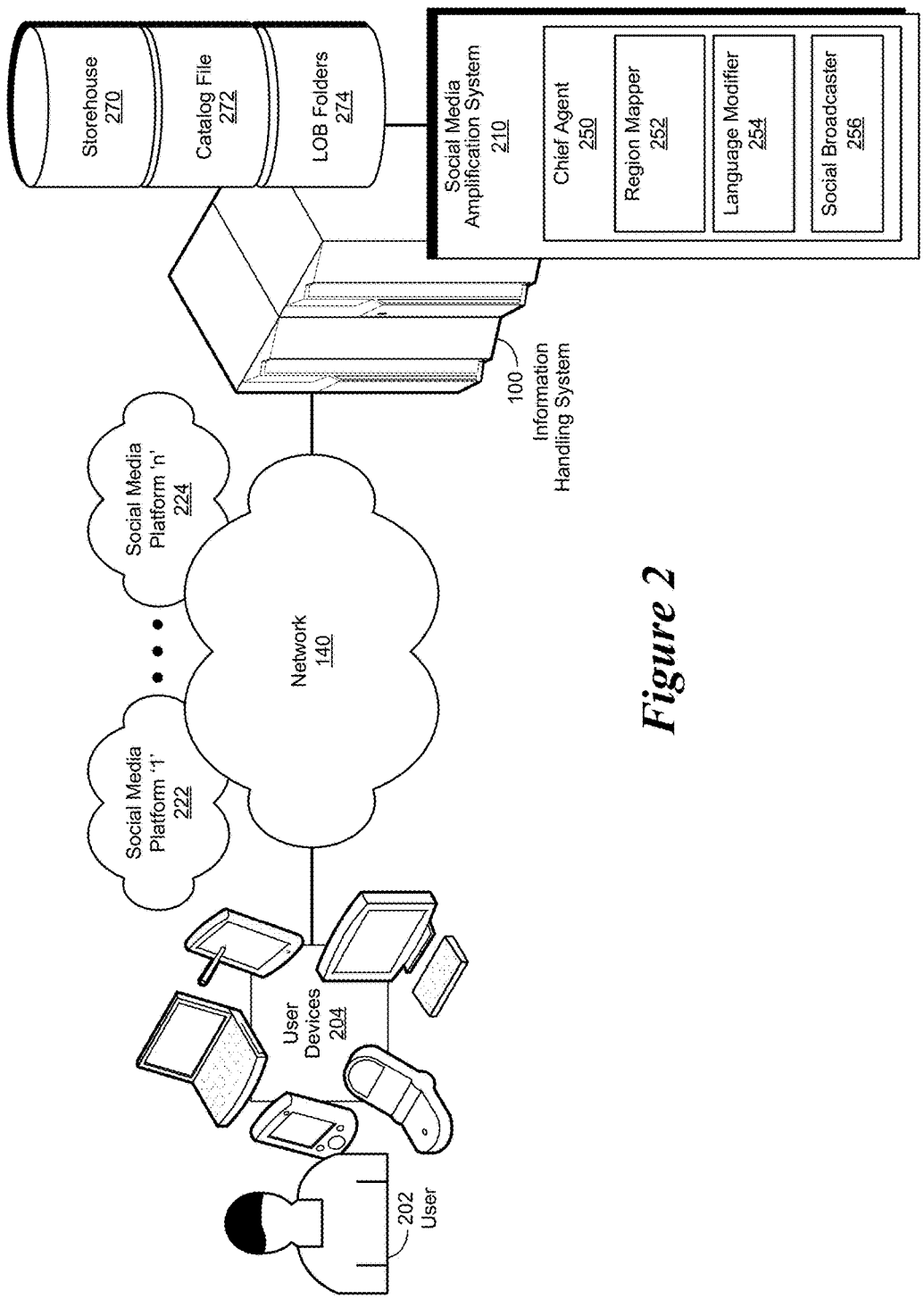
FIG. 2 shows a block diagram of a short message tag identification system operational flow.

FIG. 2 is a simplified block diagram of a social media amplification environment implemented in accordance with an embodiment of the invention. In various embodiments, a user 202 may post information to a social media platform 'a' 222 through 'n' 224, which in turn may become a trending post. In various embodiments, the post information is based upon identified trending information and is identified via a suggested tag identifier. In these and other embodiments, the user 202 may use a user device 204 to post the information to a social media environment 'a' 222 through 'n' 224.

As used herein, a user device 204 refers to an information handling system such as a personal computer, a laptop computer, a tablet computer, a personal digital assistant (PDA), a smart phone, a mobile telephone, or other device that is capable of communicating and processing data. In various embodiments, the user device 204 is used to exchange information between the user 202 and a social media environment 'a' 222 through 'n' 224 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In this embodiment, a social media amplification system 118 is implemented on an information handling system 100 to perform a social media amplification operation to a social media platform 'a' 222 through 'n' 224. In these various embodiments, the network 140 is used by the social media amplification system 118 to monitor the social media platforms 'l' 222 through 'n' 224 for tag identification information as well as trending tag identification data.

When performing a social media amplification operation, the social media amplification system 210 amplifies information over a plurality of social media platforms in different regions after analyzing demographic factors associated with the company with which the social media amplification operation is associated. Once the demographic information is collected, the social media amplification system 210 stores the demographic information in a specific social media amplification repository along with the suggestive #tags, influencers list and platforms which are proposed by the company with which the social media amplification operation is associated. The core information is then broadcast to different regions via a plurality of social media platforms in different languages so that the content receives more visibility among other information of the same trend. Different regions often prefer different social media platforms. What is popular in the United States may not be popular in Germany or Japan.

In various embodiments, the social media amplification system 210 includes some or all of the functionality of the social media amplification module 118. In certain embodiments, the social media amplification system 210 includes a chief agent 250. The chief agent 250 further includes one or more of a region mapper module 252, a language modifier module 254 and a social broadcaster module 256.

In various embodiments, the chief agent 250 is associated with and executes on a server type information handling system such as information handling system 100. The server type information handling system may be internal to a particular company or may be associated in some way with a particular company such as by executing on a virtual machine which is remotely located but is controlled by the company. The chief agent 250 communicates with and receives information from a social media platform such as the Twitter social media platform. In certain embodiments, the chief agent 250 accesses the social media platform via a predefined set of application program interfaces (APIs) such as the streaming APIs available from certain social media platforms.

The chief agent 250 executes on a server type information handling system 100 which is coupled to a network 140 so as to be able to interact with social media platforms 222, 224. The chief agent 250 accesses uses streaming application program interfaces (APIs) from the various social media platforms 222, 224. In certain embodiments, the streaming APIs are provided by a short message social media platform such as the Twitter social media platform. In various embodiments, the streaming APIs provide the chief agent 250 access of to the public streams, users streams and site streams. The streaming enables the server type information handling system to execute different queries from multiple platforms. In certain embodiments, the chief agent 250 has the control to work on inbound data and periodically check out bound data to enhance the internal parameters (e.g., demographic parameters) when performing a social media amplification operation.

After the chief agent 250 collects the information from the social media platform, the chief agent stores the parameters for its product portfolio within a storehouse repository 270. In certain embodiments, the chief agent 250 interacts with one or more line of business (LOB) specific filters to categorize the collected data. This categorization information is stored within a catalog file 272 (catalogfile). The information collection is performed by the chief agent 250 on a regular basis and the chief agent 250 categorizes the collected data periodically. In certain embodiments, wherever there is a (region specific) newer influencers, newer #tags, the storehouse repository 270 and the catalog file 272 are updated accordingly. The chief agent 250 provides the company with an interface to the social media platforms 222, 224. These devices will fetch the catalog file periodically so that they have access to the most recent parameters. The social media amplification system 210 can be configured regarding how often to collect parameters from social media platforms and how often to generate the catalog file 272.

The chief agent 250 applies the relevant parameter related information when posting to a particular social media platform. The chief agent 250 also allows the posts to take into account trending information when posting to a particular social media platform.

More specifically, the chief agent uses the region mapper module 252 to interact with the social media platforms to check for outbound posts in a particular language. The region mapper module 252 also associates the outbound posts with a particular line of business of the company. In certain embodiments, the associating with a particular line of business is based on tag data (e.g., #tag) associated with the post. Additionally, in certain embodiments, the associating with a particular line of business is based on, influencers associated with the post. Additionally, in certain embodiments, the associating with a particular line of business is based on, content associated with the post. The region mapper module also identifies regions where the company has business for the associated line of business and adds targeted regions to the association of the outbound post. The region mapper module 252 also obtains a list of social media platforms related to the targeted regions. The region mapper module 252 also captures any trending tag data related to the targeted regions. The region mapper module 252 also identifies influencers related to the targeted regions.

After the outbound posts are captured, the region mapper analyzes the outbound posts based on the predefined key words and tag data. The key words and tag data are stored within a LOB specific location (e.g., a LOB specific folder 274) in the storehouse repository 270. In certain embodiments, the key word and tag data are selected to best describe the products or services of the LOB.

Based on business analytics, the region mapper module 252 can then identify the important and/or targeted regions for the particular LOB. Based on the business analytics, the LOB based folders 274 store information about important social media platforms for the regions important to the LOB. By capturing the data relating to the social media posts, the region mapper 252 facilitates developing a social media amplification strategy which defines a different regions and social media platforms to emphasize particular social media posts. In certain embodiments, the region mapper 252 can also accept customer driven generic data and add them back to the database.

The language modifier module 254 includes the intelligence to translate the text of a post based on a filter which defines the language for a particular region. The language modifier module 254 removes any influencers and tag data from an original post and appends new set of influencers and tag data appropriate for the target region. Inputs for the language modifier module 254 are provided by the region mapper module 252. The language modifier module 254 interacts with region mapper module 252 to collect the catalog file. The language modifier module 254 checks the availability of region based filters before downloading the catalog files for the target regions, thus confirming the use of the latest available file.

In certain embodiments, the language modifier module 254 also applies any updated trends which are originating from the target region to the outgoing posts and information. The language modifier module 254 also uses recent tag data and list of influencers for the target region.

The social broadcaster module 256 provides an interactive portion of the chief agent 250. The social broadcaster module 256 acts with a plurality of social media platforms. Once the new post (i.e., a post in different language from an original post) is ready, the post is returned to the same LOB specific folder 274 from where it came. The chief agent 250 assigns any related handles, initiates other platform specific channels using social broadcaster module 256. The social broadcaster module has a collection of identifiers (IDs) (from the plurality of social media platforms) for a specific LOB and for a specific region. For certain products of a company, there may be multiple sets of such IDs. Once the correct handle is assigned by the chief agent 250, the associated (multiple social media platforms) company IDs are initiated by social broadcaster module 256. In certain embodiments, the social broadcaster module 256 also controls the timing for posting the information to the social media platforms in different regions. As discussed herein, social media can have a different impact in different time zones and regions, this social broadcaster module 256 controls the posting specifics for each target region. Based on the target region, to social broadcaster module 256 broadcasts the information at a particular time.

Figure 3:
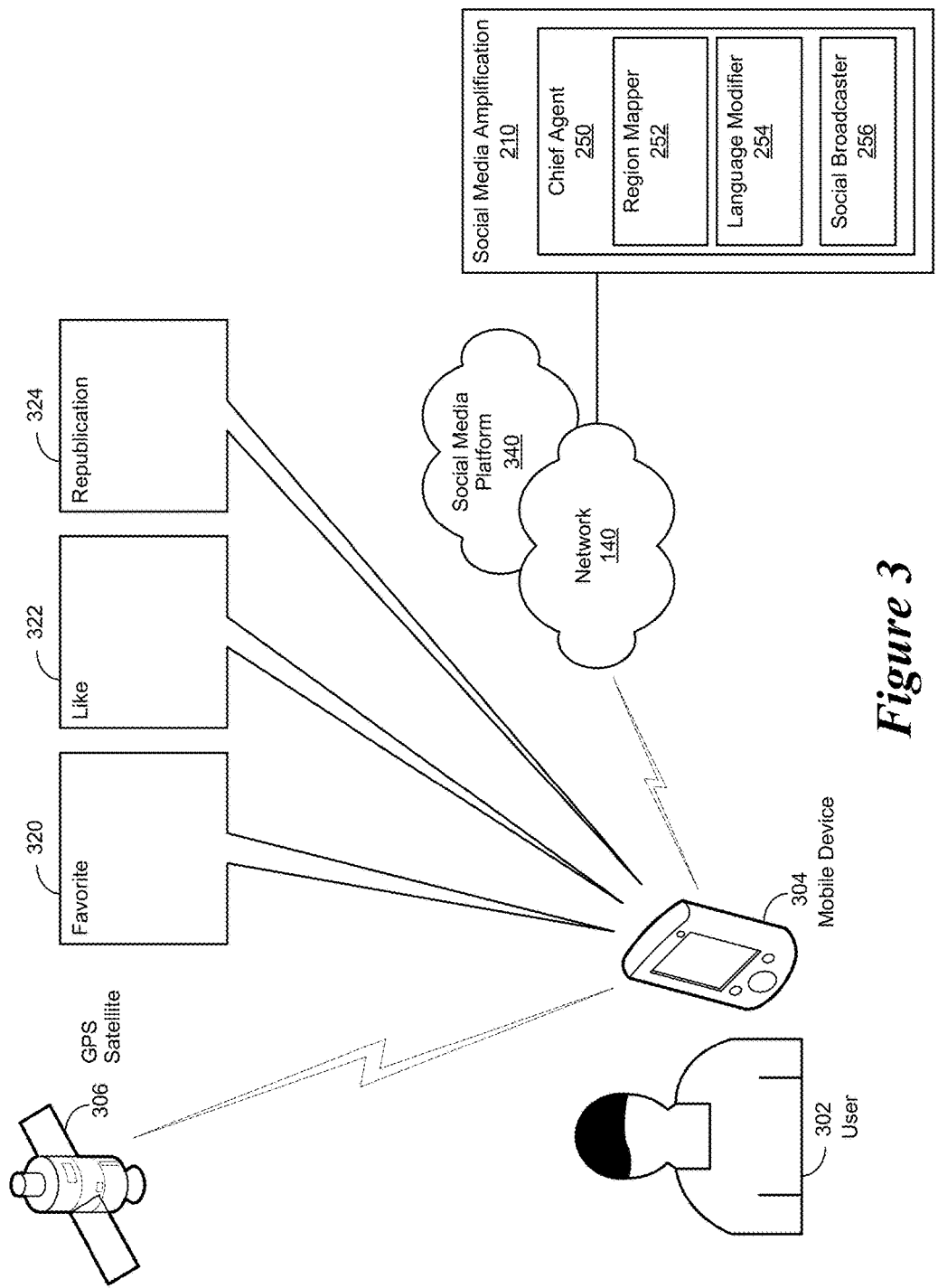
FIG. 3 shows a block diagram of an overview of a short message tag identification system environment.

FIG. 3 shows a simplified block diagram of the delivery of a short message implemented in accordance with an embodiment of the invention. As used herein, a short message broadly refers to a short message associated with a social media platform. In this and other embodiments, these short messages may be delivered to a mobile device 304 being used by a user 302. The social media amplification system 210 is used to provide short messages to social media platforms 340 for target regions.

As used herein, a mobile device 304 refers to wireless devices such as mobile telephones, smart phones, personal digital assistants (PDAs), tablet computers, handheld or laptop computers, and similar devices that have telecommunications capabilities. In various embodiments, the mobile device 304 is used to exchange information between a user 302 and a short message tool 310, described in greater detail herein through the use of a network 140. In certain embodiments, the network 140 is likewise used by the mobile device 304 to exchange information between the user 302 and one or more social media platforms 340.

In various embodiments, the network 140 may be a public network, such as the Internet, a physical private network, a virtual private network (VPN), a wireless network, or any combination thereof. In certain embodiments, the wireless network may be a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on existing third generation (3G) wireless technologies including universal mobile telecommunications system (UMTS) and wideband code division multiple access (W-CDMA).

Other embodiments may include the implementation of other 3G technologies, including evolution-data optimized (EVDO), IEEE 802.16 (WiMAX), wireless broadband (Wi-Bro), high-speed downlink packet access (HSDPA), high-speed uplink packet access (HSUPA), and emerging fourth generation (4G) wireless technologies. Skilled practitioners of the art will realize that many such embodiments are possible and the foregoing is not intended to limit the spirit, scope or intent of the invention.

In various embodiments, the short message may be delivered in the form of a Short Message Service (SMS) message, a Multimedia Messaging Service (MMS) message, or a Tweet® message, provided by Twitter, Inc. of San Francisco, Calif. Skilled practitioners of the art will be familiar with SMS messages, which are a text messaging service component of telephone, Web, or mobile communication systems. SMS messages are limited to a total of 160 seven-bit characters and use a stateless communications protocol, meaning every SMS message is considered independent of other messages. In certain embodiments, SMS messages may be concatenated to provide larger amounts of content within the cognitive short message. While SMS is typically implemented for person-to-person (P2P) messaging, it may also be implemented in certain embodiments for application-to-person (A2P) messaging. As an example, the short message tool 310 may be implemented to deliver a short message to a user's 302 mobile device 304.

Those of skill in the art will likewise be familiar with MMS messages, which provide a way to send messages that include multimedia content to and from mobile devices 304. Currently, the most popular use of MMS is to send photographs from camera-equipped mobile devices 304. However, MMS may implemented in various embodiments to deliver news and entertainment content as part of a cognitive short message. In certain embodiments, MMS may likewise be implemented to deliver scannable coupon codes, product images, audio, videos and other information as part of a cognitive short message.

Twitter, Inc. will likewise be familiar to skilled practitioners of the art as a social media service that allow users to send and receive short, 140 character messages, known as Tweets®. Currently, registered users of Twitter can read and post Tweets®, but unregistered users are only allowed to receive them. In various embodiments, Twitter can be accessed through a website interface, SMS, or an application implemented on a mobile device 304. In these and other embodiments, Twitter users may subscribe to Tweets® from other users, which is known as "following." In certain embodiments, Tweets® may be implemented to accommodate multimedia content. In these embodiments, the multimedia content may be provided as part of a cognitive short message delivered as a Tweet®.

Short message operations are initiated by first selecting a target user 302 and then performing ongoing monitoring operations to monitor their social media interactions, their physical location, and the current date and time. If a social media interaction 320 by the target user 302 is detected, then data associated with the social media interaction is captured. For example, the social media interaction data may include a user post 320 to a social media platform 340 (e.g., a tweet). The user post may take the form of a favorite indication within a short message 320, a like indication within a short message 322 or a republication (also referred to as a forwarding) short message 324 (e.g., a re-tweet). Additionally, in certain embodiments, the location of the user 302 may be determined through the use of Geographical Positioning System (GPS) satellite 306 data acquired by the user's mobile device 304. Some or all of the information gathered when performing short message operations may be used when performing a social media amplification operation. For example, in certain embodiments, trending information may be derived from information obtained from the short message operations.

In certain embodiments, various user devices 204 provide an interface with the social media platform. These user devices 204 fetch information from the database and/or the catalog file on a regular basis (e.g., periodically) so as to have access to the information relating to social media amplification operations. The user 202 may be an administrative user who can schedule the process of obtaining this information. The user 202 can also collect information stored to the database by the chief agent 250 as well as any catalog file generated by the chief agent on any desired time period.

Using this information, a user 202 can now use the social media amplification information when posting to a particular social media platform. The user 202 can also use this information to join an ongoing trend within one or more social media platforms.

Figure 4:
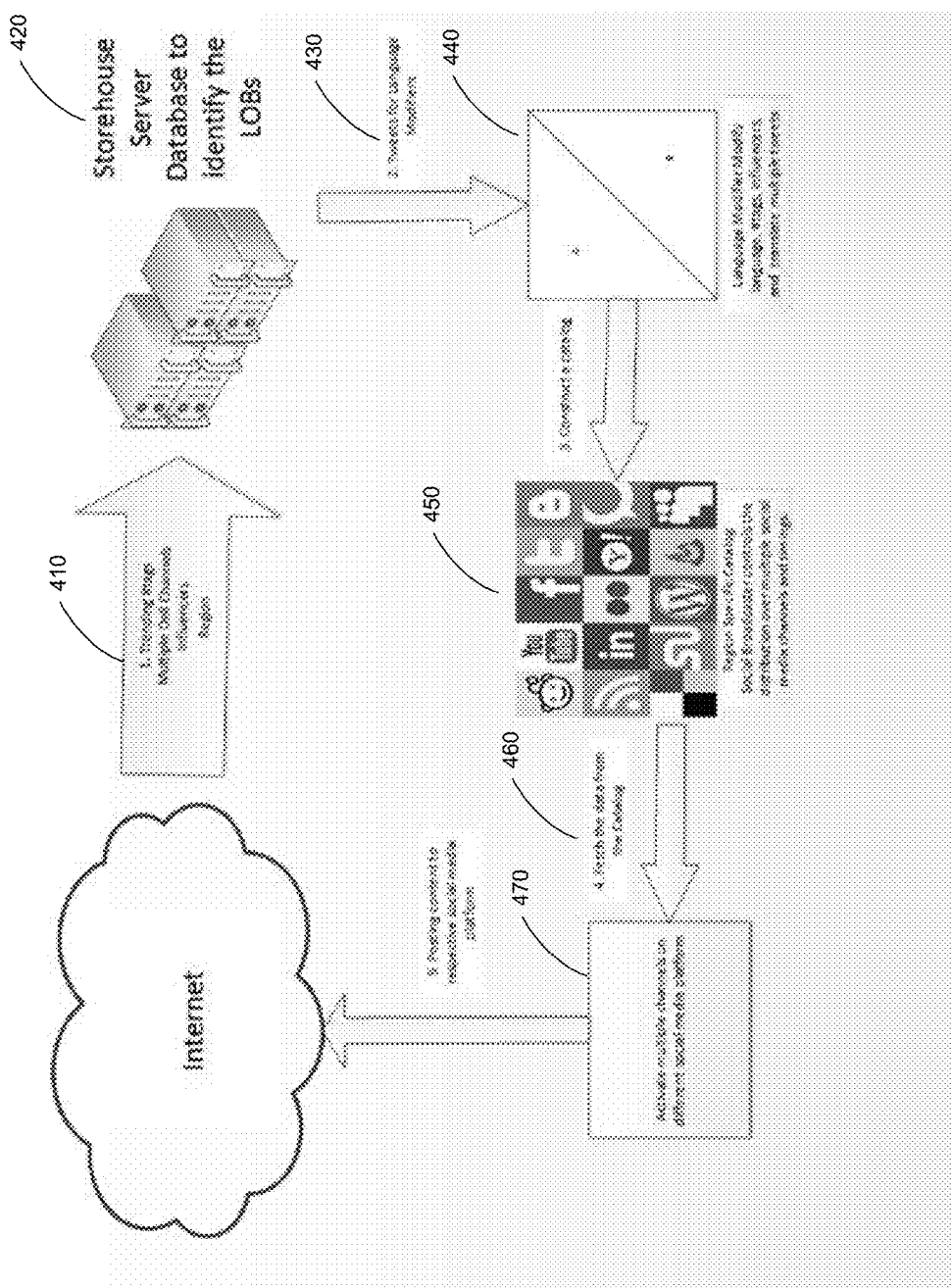
FIG. 4 shows a flow chart of a social media amplification operation.

Referring to FIG. 4, a flow chart of a social media amplification operation 400 is shown. More specifically, the operation begins at step 410 with the social media amplification system 210 identifies any outbound posts that are associated with any line of business of a company operating the social media amplification operation. Next at step 420, the information is stored within the storehouse repository 270. Next, at step 430, the social media amplification system 210 identifies posts on which a language modification operation is to be performed. Next, at step 440, the language modifier performs a modification operation based upon a target region. The modification operation performs one or more of modifying the content of the post, modifying any tag data associated with the post and modifying any influencer information associated with the post. Next at step 450, the social broadcaster controls distribution of the modified post based upon the target region. The control can include one or more of controlling a time that the information is posted to a social media platform of the target region, the social media platform to which the information is posted and the language used to post the information to the target region. Next at step 460, the social media amplification system 210 fetches data from the catalog file 272 related to the post. Next, at step 470, depending on identified target regions the social media amplification system 210 activates multiple channels on different social media platforms. Next at step 480, the social media amplification system 210 posts content to the respective social media platforms.

Figure 5:
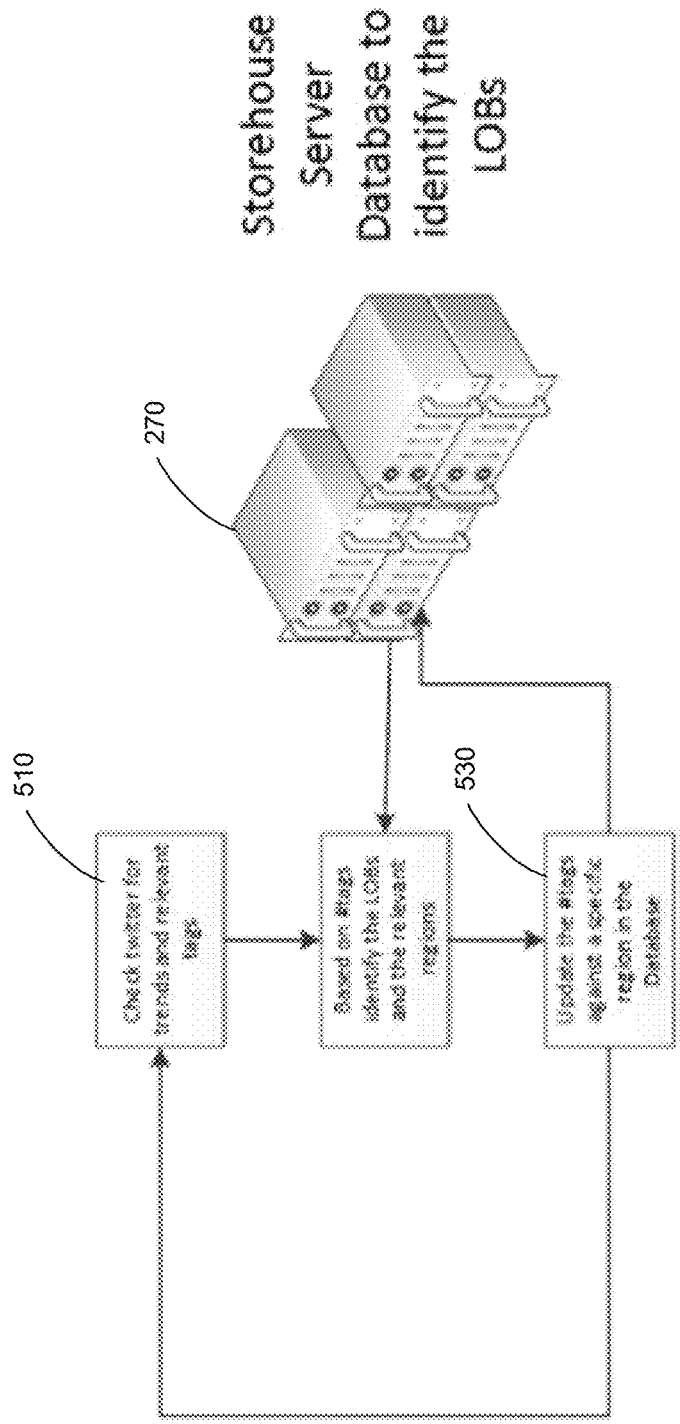
FIG. 5 shows a flow chart of an organization operation.

Referring to FIG. 5, a flow chart of an organization operation 500 of a social media amplification operation is shown. More specifically, the organization operation 500 begins at step 510 with the social media amplification system 210 checking social media platforms for trends and/or tag data relating to interests of the company for which the social media amplification system 210 is executing. Next at step 520, the social media amplification system 210 identifies lines of business and relevant regions for which the trends and/or tag data is relevant. Next, at step 530, the social media amplification system 210 updates the tag data for specific regions within the storehouse repository 270.

Figure 6:
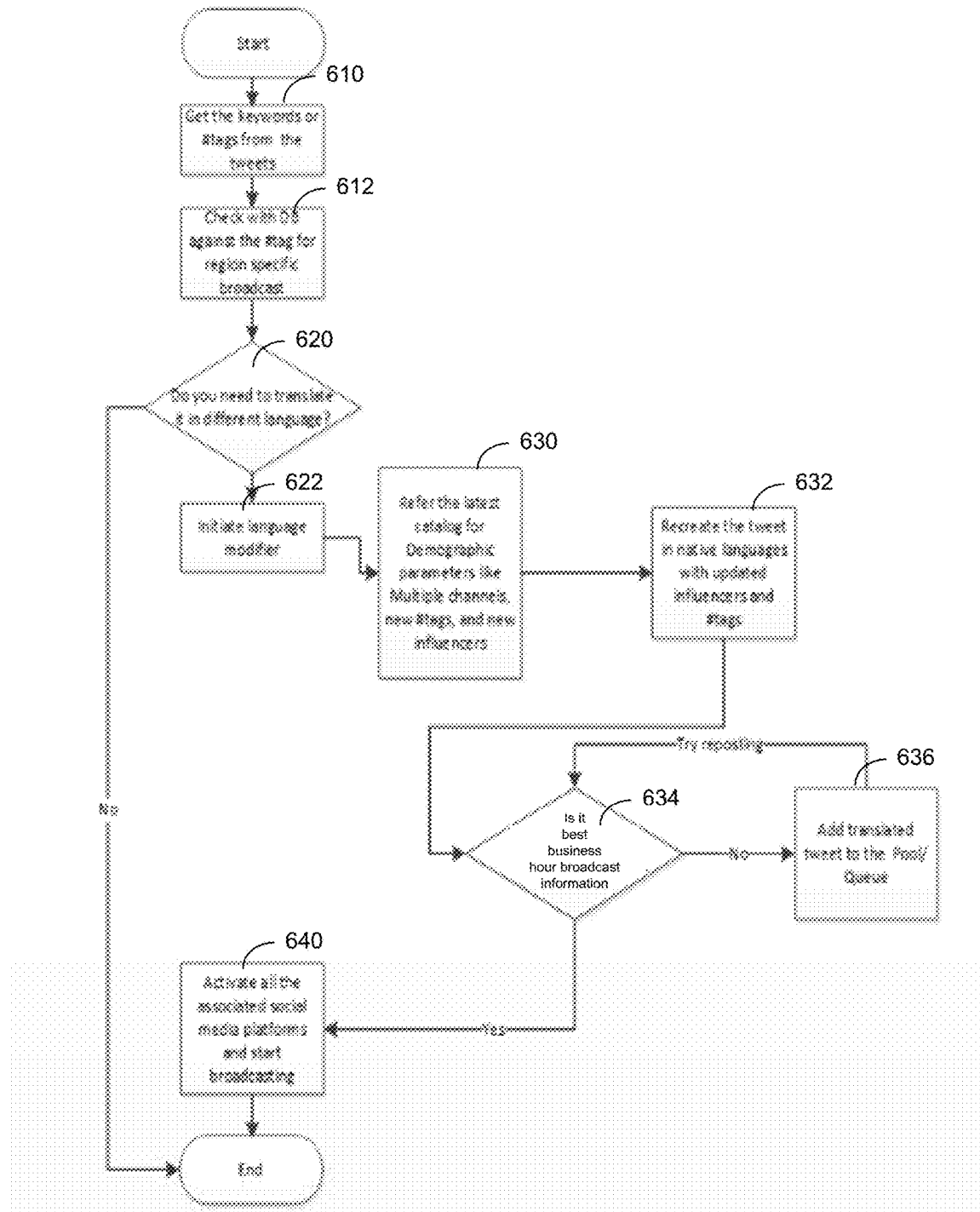
FIG. 6 shows a flow chart of a broadcast operation.

Referring to FIG. 6, a flow chart of a broadcast operation of a social media amplification operation is shown. More specifically, the operation begins at step 610 with the social media amplification system 210 obtaining any keywords and tag data from an outgoing social media post. Next, at step 612 the social media amplification system 210 checks the storehouse repository 270 against the tag data for target regions to which the outgoing social media post should be broadcast. Next, at step 620, the social media amplification system 210 determines whether the outgoing post should be translated for any identified target regions. Next, at step 622, the social media amplification system 210 initiates a language modification operation. Next at step 630, during the language modification operation the social media amplification system 210 accesses the most recent version of the catalog stored within the storehouse repository 270 to identify demographic parameters that should be considered when amplifying the content for a target region. The demographic parameters can include identifying different or multiple social media platforms, generating new tag data, and identifying new influencers. Next at step 632, the social media amplification system 210 recreates the content in the native languages of the target regions. This content can be further modified to include influencers and/or tag data directed to the target region. Next, at step 634, the social media amplification system 210 accesses the storehouse repository 270 to determine whether the present time (i.e., the posting time of the original outgoing content) corresponds to a preferred time to post the content for each target region. If not, then at step 636, the social media amplification system 210 adds the created content to a post queue for posting at the preferred time. When the preferred time is reached, then at step 640 the social media amplification system 210 activates the associated social media platforms for the target regions and initiates broadcasting of the target region modified content.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a social media amplification operation within social media amplification environment, the social media amplification environment comprising a social media amplification system executing on a hardware processor of an information handling system, a social media amplification repository, a social media platform and a user device, the social media amplification system, the social media platform and the user device exchanging information via a network, comprising:
    monitoring the social media platform for an outgoing post, the outgoing post containing content of interest, the monitoring being performed by a chief agent, the chief agent collecting information from the social media platform via an application program interface of the social media platform;
    determining whether the content of interest applies to a target region via the social media amplification system, the determining being performed by a region mapper module of the chief agent, the region mapper module interacting with the social media platform to check whether the outgoing posts is in a particular language;
    automatically modifying the outgoing post via the social media amplification system to apply to the target region to provide a modified post; and,
    broadcasting the modified post to a different social media platform, the different social media platform being associated with the target region.

2. The method of claim 1, wherein:
    the automatically modifying comprises translating a language of the content of interest to a language of the target region.

3. The method of claim 1, wherein:
    the automatically modifying comprises modifying tag data associated with the outgoing post to apply to the target region.

4. The method of claim 1, wherein:
    the automatically modifying comprises adjusting a broadcast time for the modified post to correspond to a time change associated with the target region.

5. The method of claim 1, wherein:
    the automatically modifying comprises associating a region specific user name with the modified post for a particular region.

6. A system comprising:
    a processor;

a data bus coupled to the processor; and a non-transitory, computer-readable storage medium embodying computer program code, the non-transitory, computer-readable storage medium being coupled to the data bus, the computer program code interacting with a plurality of computer operations for performing a social media amplification operation within social media amplification environment, the social media amplification environment comprising a social media amplification system executing on a hardware processor of an information handling system, a social media amplification repository, a social media platform and a user device, the social media amplification system, the social media platform and the user device exchanging information via a network and comprising instructions executable by the processor and configured for:

monitoring the social media platform for an outgoing post, the outgoing post containing content of interest, the monitoring being performed by a chief agent, the chief agent collecting information from the social media platform via an application program interface of the social media platform;

determining whether the content of interest applies to a target region via the social media amplification system, the determining being performed by a region mapper module of the chief agent, the region mapper module interacting with the social media platform to check whether the outgoing posts is in a particular language;

automatically modifying the outgoing post via the social media amplification system to apply to the target region to provide a modified post; and, broadcasting the modified post to a different social media platform, the different social media platform being associated with the target region.

7. The system of claim 6, wherein:

the automatically modifying comprises translating a language of the content of interest to a language of the target region.

8. The system of claim 6, wherein:

the automatically modifying comprises modifying tag data associated with the outgoing post to apply to the target region.

9. The system of claim 6, wherein:

the automatically modifying comprises adjusting a broadcast time for the modified post to correspond to a time change associated with the target region.

10. The system of claim 6, wherein:

the automatically modifying comprises associating a region specific user name with the modified post for a particular region.

11. A non-transitory, computer-readable storage medium embodying computer program code for performing a social media amplification operation within social media amplification environment, the social media amplification environment comprising a social media amplification system executing on a hardware processor of an information handling system, a social media amplification repository, a social media platform and a user device, the social media amplification system, the social media platform and the user device exchanging information via a network, the computer program code comprising computer executable instructions configured for:

monitoring the social media platform for an outgoing post, the outgoing post containing content of interest, the monitoring being performed by a chief agent, the chief agent collecting information from the social media platform via an application program interface of the social media platform;

determining whether the content of interest applies to a target region via the social media amplification system, the determining being performed by a region mapper module of the chief agent, the region mapper module interacting with the social media platform to check whether the outgoing posts is in a particular language;

automatically modifying the outgoing post via the social media amplification system to apply to the target region to provide a modified post; and, broadcasting the modified post to a different social media platform, the different social media platform being associated with the target region.

12. The non-transitory, computer-readable storage medium of claim 11, wherein:

the automatically modifying comprises translating a language of the content of interest to a language of the target region.

13. The non-transitory, computer-readable storage medium of claim 11, wherein:

the automatically modifying comprises modifying tag data associated with the outgoing post to apply to the target region.

14. The non-transitory, computer-readable storage medium of claim 11, wherein:

the automatically modifying comprises adjusting a broadcast time for the modified post to correspond to a time change associated with the target region.

15. The non-transitory, computer-readable storage medium of claim 11, wherein:

the automatically modifying comprises associating a region specific user name with the modified post for a particular region.

* * * * *